United States Patent [19]

Mori et al.

[11] Patent Number: 5,582,521
[45] Date of Patent: Dec. 10, 1996

[54] CHARGING CONNECTOR

[75] Inventors: Shigeo Mori; Toshiaki Hasegawa, both of Shizuoka, Japan

[73] Assignee: Yazaki Corporation, Tokyo, Japan

[21] Appl. No.: 362,926

[22] Filed: Dec. 23, 1994

[30] Foreign Application Priority Data

Dec. 27, 1993 [JP] Japan .................................. 5-347133

[51] Int. Cl.⁶ .................................................. H01R 13/44
[52] U.S. Cl. ............................................................. 439/142
[58] Field of Search .......................... 439/131, 142–144

[56] References Cited

U.S. PATENT DOCUMENTS

| | | | |
|---|---|---|---|
| 3,189,212 | 6/1965 | Bellek | 439/142 |
| 4,037,907 | 7/1977 | Klimek et al. | 439/142 |
| 4,456,145 | 6/1984 | Frank | 439/142 |
| 4,793,819 | 12/1988 | Berg | 439/142 |

FOREIGN PATENT DOCUMENTS 1665626  11/1971  Germany.
395575   9/1991   Japan ................................ H01R 13/52
4124774  11/1992  Japan ................................ H01R 13/52

*Primary Examiner*—David L. Pirlot
*Assistant Examiner*—Eugene G. Byrd
*Attorney, Agent, or Firm*—Sughrue, Mion, Zinn, Macpeak & Seas

[57] ABSTRACT

A waterproof cap is pivotally mounted for opening and closing at a position near to a connection open portion of a charging connector. The waterproof cap is provided with a stopper member for preventing the opening/closing movement of the waterproof cap at an intermediate stop position during an opening stroke of the cap. At least one of the stopper member and a portion against which the stopper member can abut is resiliently deformable. The stopper member can be contacted with the stopper member-abutting portion in such a condition that the waterproof cap can be held at the intermediate stop position and that because of the above resilient deformation, the stopper member can move into a position beyond the intermediate stop position.

6 Claims, 5 Drawing Sheets

CHARGING CONNECTOR

BACKGROUND OF THE INVENTION

1. Field of the Invention

This invention relates to the construction of a charging connector, and more particularly to an improved waterproof cap for a charging connector used in a machine requiring a charging operation, such as an electric car.

2. Related Art

In conveyance cars used for physical distribution, or electric cars recently attracting attention, a charging connector, serving as a connection means for charging purposes, has been mounted on a suitable portion of a vehicle body. It is quite important that this charging connector should not suffer from leakage of electricity, and therefore a waterproof cap is provided on this connector for preventing water and dust from intruding into the connector when it is not in use. Also, this connector is mounted in a recess provided in the vehicle body so that it will not project from the vehicle body.

Particularly in the waterproof construction of a charging connector used outdoors, as in an electric car, there is a great risk that water will intrude into this connector. Therefore a body cover (that is, an openable lid constituting part of an outer surface of the vehicle body) mounted on the outer surface of the vehicle body, which protects against water and dust to a certain degree. Also, a waterproof cap is attached to a connection open portion of the charging connector, thus providing additional protection against the intrusion of water and dust into the charging connector.

In such a waterproof construction of a charging connector shown, for example, in FIG. 9, when the charging connector 70 is not in use (that is, the charging operation is not effected), the user fits a waterproof cap 72 on a connection open portion of the charging connector 70 to prevent the entry of water and dust, and this charging connector 70 is mounted in a suitable recess 78. This recess 78 is adapted to be closed and opened by a body cover 77. The waterproof cap 72 is pivotally mounted by a pin 74 on a bracket 76 formed on a side wall of the connection open portion of the charging connector 70. One end of a torsion spring 75 wound on the pin 74 is engaged with the bracket 76 while the other end of this torsion spring is engaged with the waterproof cap 72, so that this waterproof cap 72 is urged in a suitable direction.

When this charging connector 70 is in use as shown, for example, in German Patent DT1665626, this connector is fitted on a male connector 90 of a power source, as shown in FIG. 10. At this time, the waterproof cap 72 is urged about the pin 74 by the torsion spring 75, and also a rear end 80 of the cap extending around the pin 74 is held against a bracket 81, so that the cap 72 is kept or retained upright. On the other hand, when the connector is not in use, the waterproof cap 72 closes the open portion of the connector, and is retained by a cap lock member 78 engaging a portion of the outer peripheral edge of the waterproof cap 72.

For effecting the above charging operation, the waterproof cap 72 is opened by releasing the locking by the cap lock member 78, and the waterproof cap 72 is kept upright with the rear end 80 held against the bracket 81, as shown in FIG. 10. Namely, the waterproof cap 72 is automatically opened into such a suitable position that it will not interfere with the connection and disconnection of the male connector 90, and the cap is retained in this position. Since the waterproof cap 72 is kept open in an upright condition as shown in FIG. 10, the open portion of the charging connector 70 can be easily closed after the charging operation is effected.

However, during the charging operation and particularly during the disconnection of the male connector 90, this male connector 90 or the operator may sometimes contact the waterproof cap 72. When the force is exerted, for example, in a direction of arrow X in FIG. 10 as a result of this contact, the load acts on the bracket 81 and the rear end 80 because of the above retaining construction. As a result, if this load is large, there has been encountered a drawback that the bracket 81 or the rear end 80 may be damaged.

SUMMARY OF THE INVENTION

The present invention has been made in view of the above problems, and an object of the invention is to provide a charging connector of the type which provides a waterproof cap with goo operability and a simple construction, and also can prevent damage even if an accidental external force is applied.

The above object of the present invention has been achieved by a charging connector for mounting on a portion of a vehicle body, wherein a male connector for charging purposes is connectable to the charging connector, and the charging connector has a waterproof cap for opening and closing a connection open portion for the male connector; wherein the waterproof cap is pivotally mounted for opening and closing at a position near to the connection open portion of the charging connector; the waterproof cap is provided with a stopper member for preventing the opening/closing movement of the waterproof cap at an intermediate stop position during an opening stroke of the cap; at least one of the stopper member and a portion against which the stopper member can abut is resiliently deformable; and the stopper member can be contacted with the stopper member-abutting portion in such a condition that the waterproof cap can be held at the intermediate stop position and that because of the resilient deformation, the stopper member can move into a position beyond the intermediate stop position.

The above object has also been achieved by a charging connector in which the waterproof cap is urged in a cap-opening direction by resilient means mounted around a pin about which the waterproof cap is pivotally mounted, the stopper member being constituted by a resilient wall portion of the waterproof cap projecting in a direction generally away from that portion of the cap for covering the connection open portion, and a distal end surface of the stopper member being abuttable against a cap support member at the intermediate stop position.

The above object has also been achieved by a charging connector, in which a resilient member, having a deformable projection for abutment against a distal end surface of the stopper member of the waterproof cap to limit the pivotal movement of the waterproof cap, is mounted on a wall surface opposed to the stopper member.

In the above construction of the present invention, the waterproof cap is provided with the stopper member for preventing the opening/closing movement of the waterproof cap at the intermediate stop position during the opening stroke, and the waterproof cap can be held at this intermediate stop position in an open condition. And besides, at least one of the stopper member and the stopper member-abutting portion is resiliently deformable, and therefore the stopper member can be contacted with the stopper member-abutting portion in such a condition that when a further external force is applied to the waterproof cap 3, the stopper member can move past the intermediate stop position. Therefore, an accidental external force is prevented from being directly applied to the stopper member or the waterproof cap body.

In the construction of the present invention, the waterproof cap is urged by a torsion coil spring, and can be retained at the intermediate stop position by the abutment of the stopper member, and when an accidental external force is applied to the waterproof cap, the stopper member is deformed to allow a further opening movement of the cap. The cap can be easily returned to the initial position.

BRIEF DESCRIPTION OF THE PREFERRED EMBODIMENTS

DETAILED DESCRIPTION OF THE PREFERRED EMBODIMENTS

One preferred embodiment of the present invention will now be described with reference to FIGS. 1 to 6.

Figure 1:
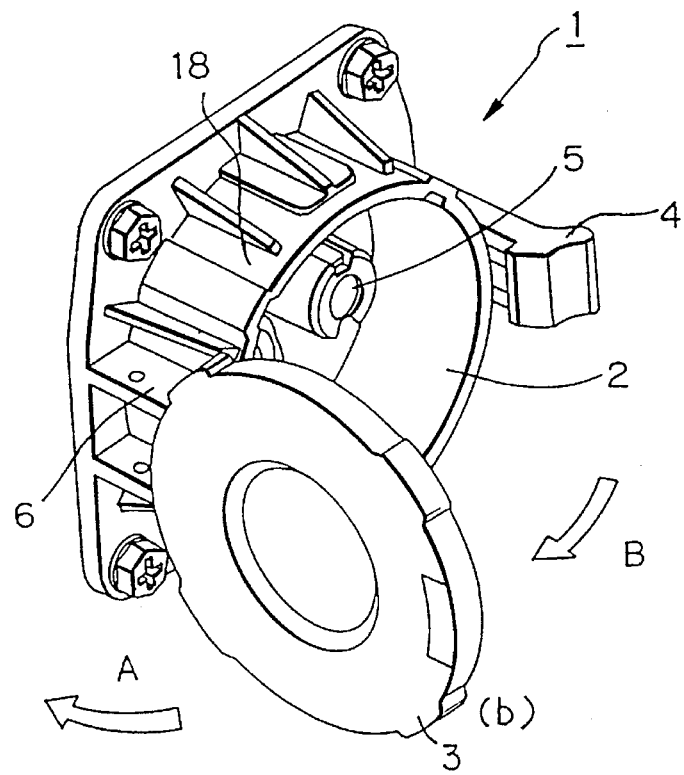
FIG. 1 is a schematic perspective view of one preferred embodiment of a charging connector of the present invention.
Figure 2:
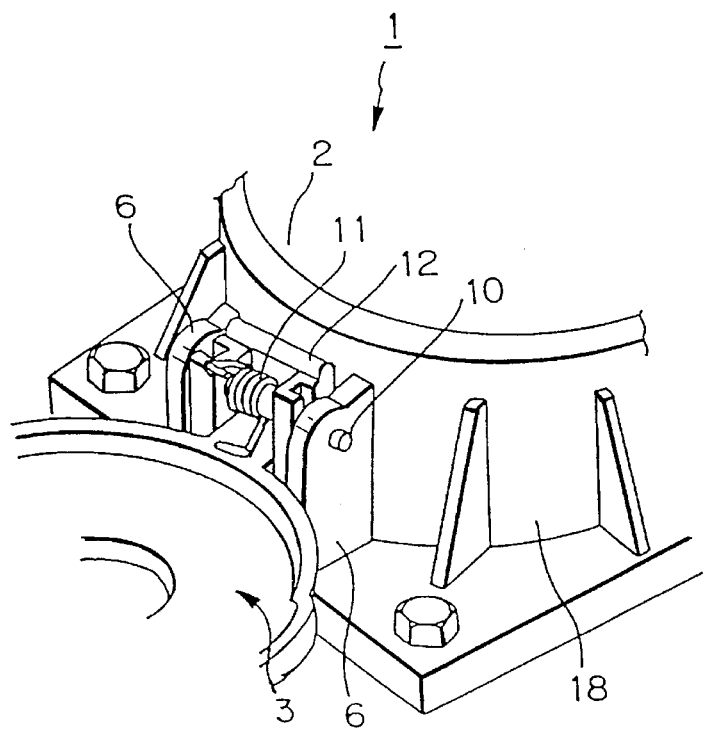
FIG. 2 is a fragmentary perspective view showing a condition in which a waterproof cap is further opened.
Figure 3:
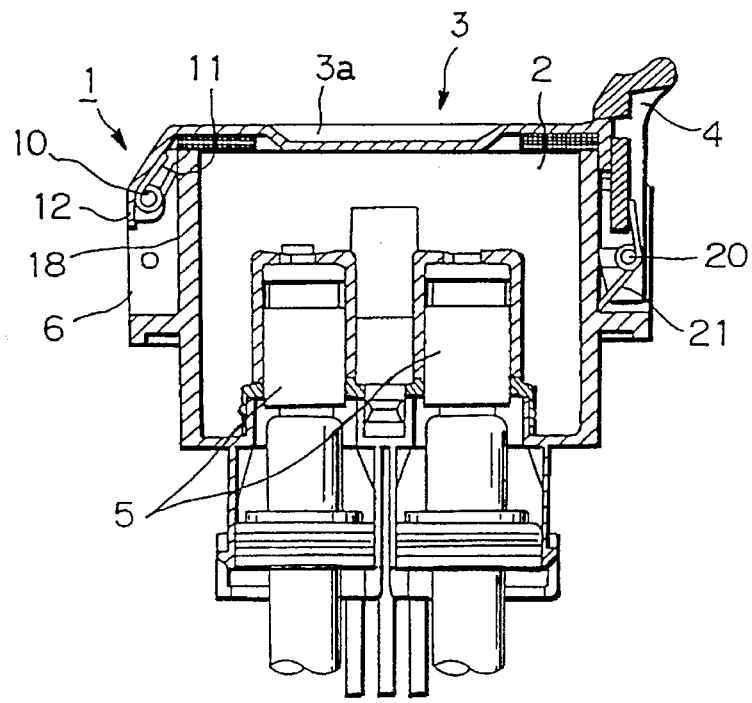
FIG. 3 is a cross-sectional view showing a condition in which the waterproof cap is closed.
Figure 4:
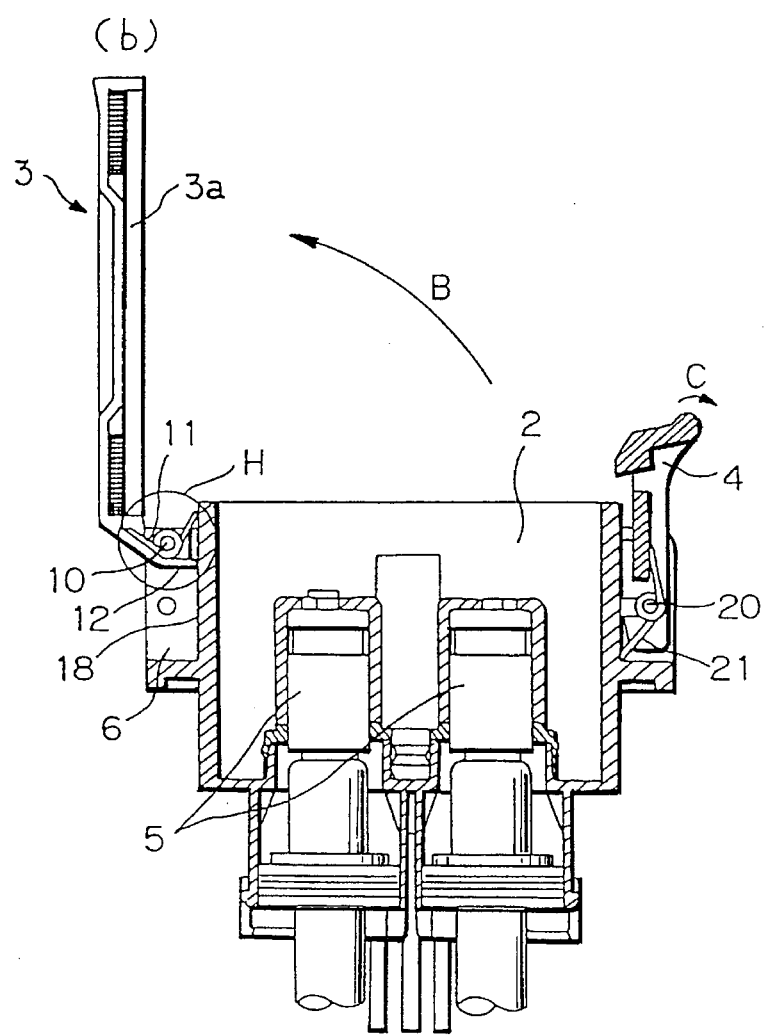
FIG. 4 is a cross-sectional view showing a condition in which the waterproof cap is opened into a predetermined position.
Figure 5:
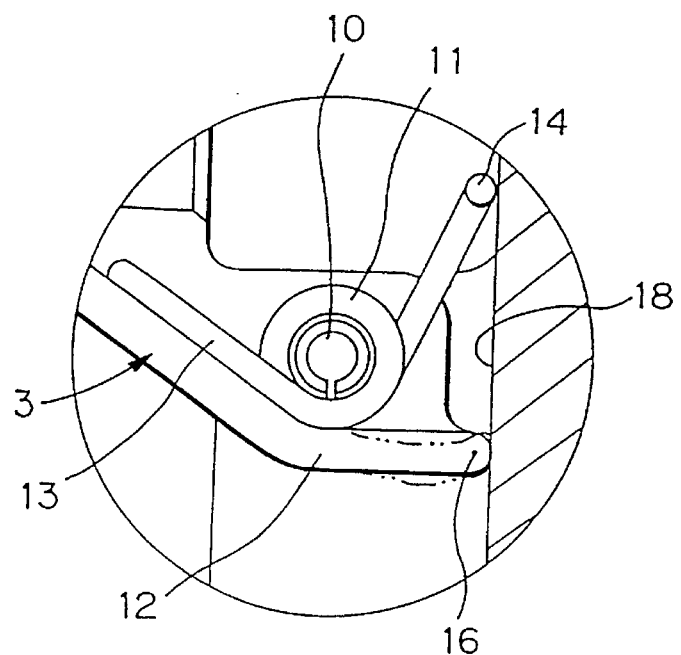
FIG. 5 is an enlarged view of a portion H of FIG. 4.
Figure 6:
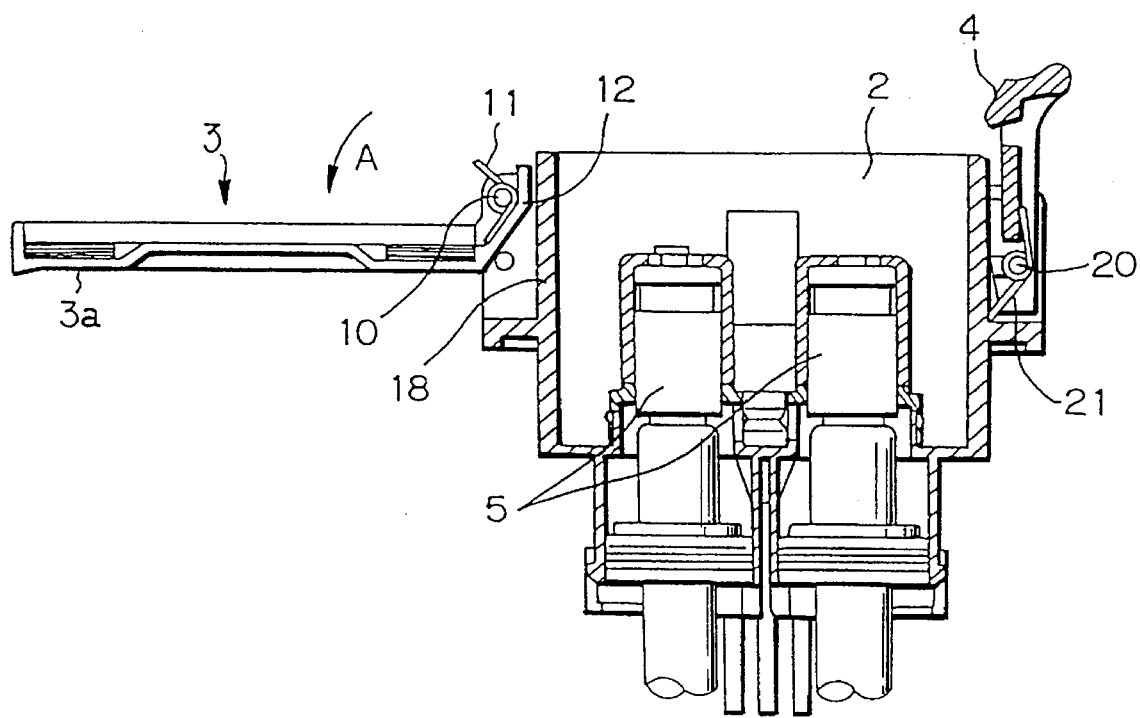
FIG. 6 is a cross-sectional view showing a condition in which the waterproof cap is further opened.

FIG. 1 is a schematic perspective view of one preferred embodiment of a charging connector of the present invention, FIG. 2 is a fragmentary perspective view showing a condition in which a waterproof cap is further opened, FIG. 3 is a cross-sectional view showing a condition in which the waterproof cap is closed, FIG. 4 is a cross-sectional view showing a condition in which the waterproof cap is opened into a predetermined position, FIG. 5 is an enlarged view of a portion H of FIG. 4, and FIG. 6 is a cross-sectional view showing a condition in which the waterproof cap is further opened.

Figure 9:
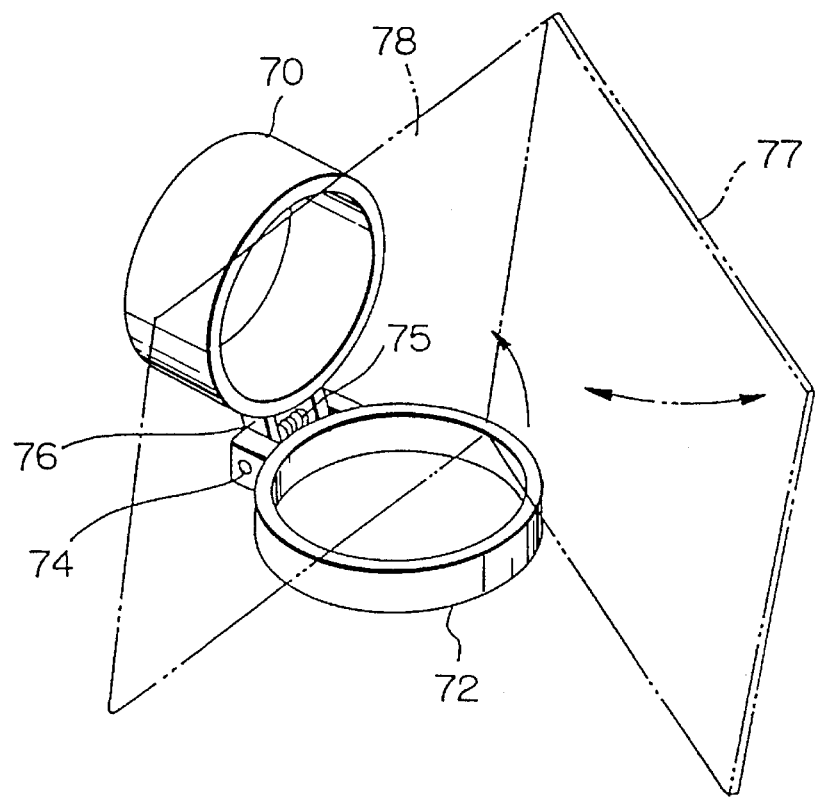
FIG. 9 is a schematic perspective view of a conventional charging connector.
Figure 10:
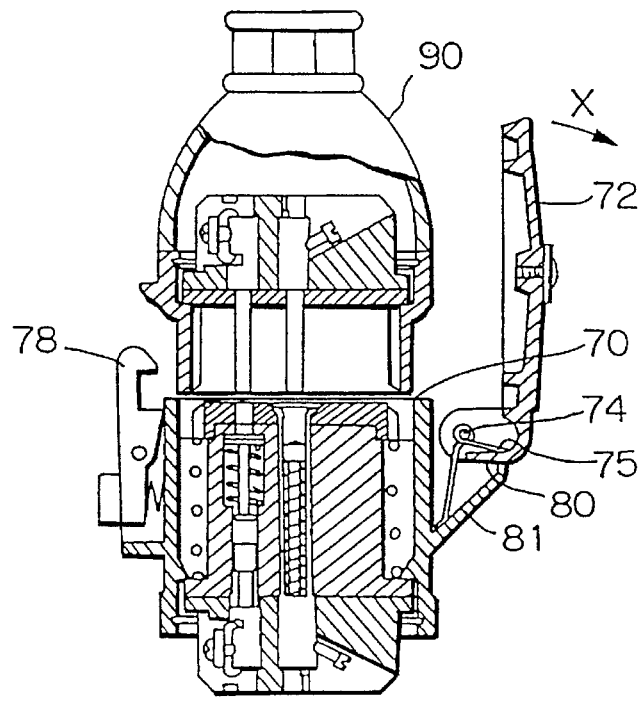
FIG. 10 is a schematic cross-sectional view of the conventional charging connector.

In FIG. 1, a suitable recess is formed, for example, in a portion of a vehicle body (not shown), and the charging connector 1 is mounted in this recess. An opening of this recess is closed and opened by a body cover (as at 77 in FIG. 9) pivotally mounted on an edge of this recess. The charging connector 1 mounted within this recess is of such a construction that an upper end of a connection open portion 2 of the charging connector 1 will not project beyond this recess.

Connection terminals 5 for connection to a male connector for charging purposes are mounted within the connection open portion 2, and the waterproof cap 3 for opening and closing the connection open portion 2 is mounted on an outer wall 18 of the connection open portion 2 through a bracket 6.

The waterproof cap 3 is, for example, integrally molded of a synthetic resin, and is supported on the bracket 6 on the connection open portion 2 for movement between an open and a closed position. The waterproof cap 3 is provided with a stopper member 12 for preventing the opening/closing movement of this cap 3 at an intermediate stop position (b) during the opening stroke. The stopper member 12 projects on one side of a pivot pin 10 directed generally away from an opening closure portion 3a, and constitutes a resilient wall portion.

More specifically, as shown in FIGS. 2 to 6, the waterproof cap 3 is urged in a cap-opening direction (that is, a direction of arrow B) by urging means such as a torsion coil spring 11 wound around the pivot pin 10, so that a distal end surface 16 of the stopper member 12, projecting in a direction generally away from the opening closure portion 3a for closing the connection open portion 2, is abutted against an outer wall 18 of a cap support member, as shown in FIGS. 4 and 5. The torsion coil spring 11 is abutted at one end 13 against an inner surface of the waterproof cap 3, and also is abutted at the other end 14 against the outer wall 18, as shown in FIG. 5.

With respect to the retaining of the waterproof cap 3 at the intermediate stop position (b), the abutment of the distal end surface 16 of the stopper member 12 against the outer wall 18 need only to provide a retaining force which resists the urging force of the torsion coil spring 11, that is, the force including an inertia force produced when the cap is opened from the retained position (FIG. 3) in the direction of arrow B upon release of the locking by a cap lock 4 (movement in the direction of arrow C). The cap lock 4 is urged by a coil spring 21 in a direction to engage the waterproof cap 3 (that is, a direction away from the direction C), the coil spring 21 being wound around a pivot pin 20.

The retaining force of the stopper member 12 at the intermediate stop position (b) is not unnecessarily strong, and when the force for further opening the waterproof cap 3 is applied, the stopper member 12 is deformed, for example, as shown in phantom in FIG. 5. As a result of this deformation, the waterproof cap 3 moves beyond the intermediate stop position to be further opened in a direction of arrow A as shown in FIG. 6.

In this embodiment, although the stopper member 12 is so deformed as to bulge downwardly in FIG. 5, it may be so designed as to be deformed in the opposite direction. Namely, the manner of this deformation is suitably determined by various conditions, such as the direction of abutment of the stopper member 12 against the outer wall 18, the positional relation between the pivot pin 10, the distal end 16 and the outer wall 18, and the shape of the stopper member 12.

In the above construction, the waterproof cap 3 is provided with the stopper member 12 for preventing the opening/closing movement of the waterproof cap 3 at the intermediate stop position during the opening stroke, and the waterproof cap 3 can be held at this intermediate stop position in an open condition, thus preventing an excessively open condition. And besides, the stopper member can be elastically deformed, and therefore the stopper member can be contacted with the stopper member-abutting portion in such a condition that when a further external force is applied to the waterproof cap 3, the stopper member can move past the intermediate stop position. Therefore, damage to the stopper member 12 or the waterproof cap body can be avoided. Furthermore, the cap can be easily returned from the excessively open position (FIG. 6) to the initial position.

In the above embodiment, although the stopper member 12 is deformable, it is only necessary in the present invention that at least one of the stopper member 12 and the stopper member-abutting portion be elastically deformable. For example, a deforming means can be provided on the outer wall 18, as shown in FIGS. 7 and 8.

Other embodiments of the present invention will now be described with reference to FIGS. 7 and 8.

Figure 7:
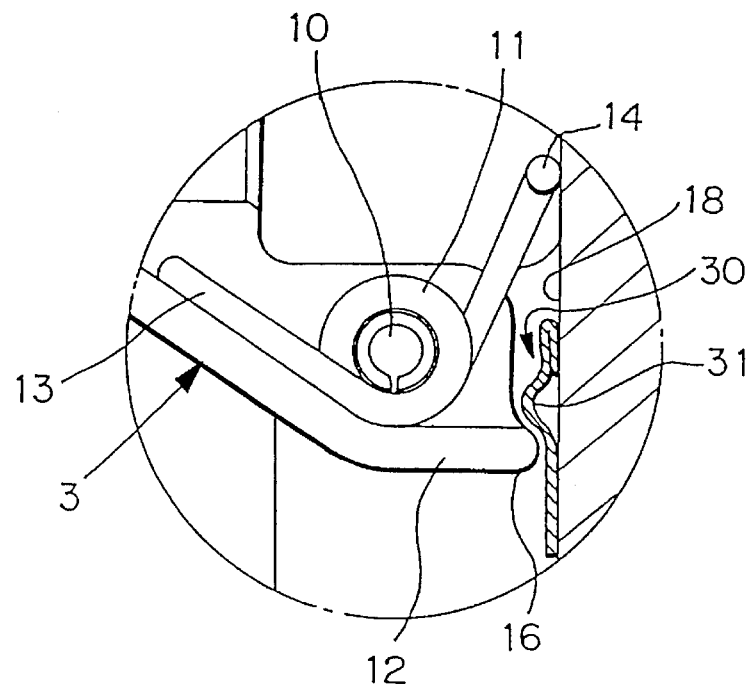
FIG. 7 is a fragmentary enlarged view of another embodiment of the present invention.
Figure 8:
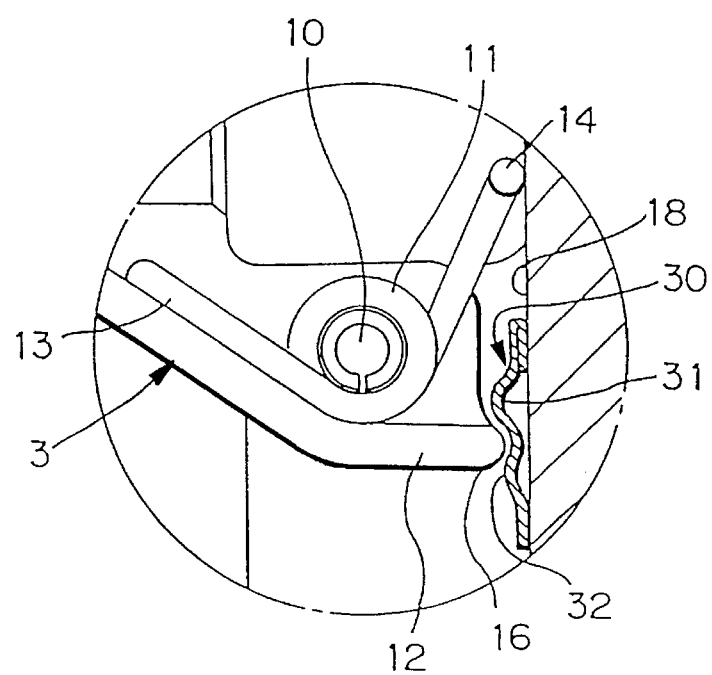
FIG. 8 is a fragmentary enlarged view of a further embodiment of the present invention.

FIGS. 7 and 8 are enlarged views showing important portions of the other embodiments using modified waterproof caps, respectively. In the embodiments of FIGS. 7 and 8, those portions which are identical to those of the above embodiment are designated by identical reference numerals, respectively, and an explanation thereof will be omitted.

In the construction shown in FIG. 7, a resilient member 30 is mounted on an outer wall 18, and has a deformable projection 31 for abutment against a distal end surface 16 of a stopper member 12 of the waterproof cap 3 to limit a pivotal movement of this waterproof cap 3, the resilient member 30 comprising, for example, a leaf spring.

The construction shown in FIG. 8 is basically similar to that of FIG. 7, but differs in construction of a resilient member 30. More specifically, in the construction shown in FIG. 8, the difference is that in addition to a projection 31, another projection 32 is formed. The height of projecting of the projection 32 is lower than that of the projection 31, and when the waterproof cap 3 is opened, a distal end surface 16 is received in a recess between the two projections 31 and 32, thereby retaining the waterproof cap 3 at an intermediate stop position. In this case, even if a torsion coil spring 11 is not provided, the waterproof cap 3 can be retained at the intermediate stop position.

The present invention is not limited to the above embodiments, and the stopper member 12 and the stopper member-abutting portion may both be deformable, or the shape of the resilient member 30, the waterproof cap 3 and the coil spring, as well as the arrangement of these parts, may be modified in various ways.

As described above, in the present invention, the waterproof cap can be retained at the intermediate stop position by the stopper member, which prevents the opening movement of the waterproof cap, in such a manner that the excessive opening of the cap is avoided to provide a good operating condition. And besides, at least one of the stopper member and the stopper member-abutting portion is resiliently deformable, and therefore the stopper member can be contacted with the stopper member-abutting portion in such a condition that when a further external force is applied to the waterproof cap, the stopper member can move past the intermediate stop position, thereby preventing damage to the stopper member or the waterproof cap body.

What is claimed is:

1. A charging connector comprising:

a waterproof cap pivotally mounted for opening and closing at a position near to the connection open portion of the charging connector, the waterproof cap having a opening closure portion for covering the connection open portion; and a stopper member for preventing the opening/closing movement of the waterproof cap at an intermediate stop position during an opening stroke of the cap, wherein the stopper member extends in a direction generally perpendicular to the opening closure portion.

2. A charging connector as claimed in claim 1, further comprising a stopper member-abutting portion disposed on a body of the charging connector, wherein at least one of the stopper member and the stopper member-abutting portion is resiliently deformable, the stopper member is abutted against the body of the charging connector when the cap is in an intermediate stop position, and the stopper member is movable to a position beyond the intermediate stop position.

3. A charging connector as claimed in claim 2, wherein the stopper member includes an urging member for urging the waterproof cap in a cap-opening direction member mounted around a pin about which the waterproof cap is pivotally mounted, the stopper member is formed by a resilient wall portion of the waterproof cap projecting in a direction generally perpendicular to the opening closure portion of the cap, and a distal end surface of the stopper member is abuttable against the stopper member-abutting portion at the intermediate stop position.

4. A charging connector as claimed in claim 2, wherein the stopper member abutting portion includes a resilient member having a first deformable projection for abutting against a distal end surface of the stopper member of the waterproof cap to limit the pivotal movement of the waterproof cap, and the resilient member is mounted on a wall surface opposed to the stopper member.

5. A charging connector as claimed in claim 4, wherein the resilient member further includes a second deformable projection and a recess formed between said first deformable projection and said second deformable projection receiving a distal end surface of the stopper member when the waterproof cap is opened and for retaining the waterproof cap at said intermediate stop position.

6. A charging connector as claimed in claim 5, wherein a height of the second deformable projection is less than a height of the first deformable projection.

* * * * *